United States Patent
Floeder et al.

(10) Patent No.: US 10,025,666 B2
(45) Date of Patent: *Jul. 17, 2018

(54) RAID SURVEYOR

(71) Applicant: Compellent Technologies, Eden Prairie, MN (US)

(72) Inventors: Anthony J. Floeder, St. Anthony, MN (US); Derek J. Anderson, Plymouth, MN (US)

(73) Assignee: Dell International L.L.C., Round Rock, TX (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/823,497

(22) Filed: Aug. 11, 2015

(65) Prior Publication Data

US 2015/0347232 A1 Dec. 3, 2015

Related U.S. Application Data

(63) Continuation of application No. 13/706,553, filed on Dec. 6, 2012, now Pat. No. 9,135,096.

(51) Int. Cl.
*G06F 11/00* (2006.01)
*G06F 11/10* (2006.01)
(Continued)

(52) U.S. Cl.
CPC ........ *G06F 11/1088* (2013.01); *G06F 11/004* (2013.01); *G06F 11/008* (2013.01);
(Continued)

(58) Field of Classification Search
CPC .. G06F 11/1088; G06F 11/004; G06F 11/008; G06F 11/0703; G06F 11/0727;
(Continued)

(56) References Cited

U.S. PATENT DOCUMENTS 7,308,602 B2 12/2007 Dandrea
7,363,546 B2 4/2008 Duncan
(Continued)

FOREIGN PATENT DOCUMENTS

WO 2006/019643 2/2006

OTHER PUBLICATIONS

Patterson, David A. et al. "A Case for Redundant Arrays of Inexpensive Disks (RAID)", ACM SIGMOD Record, vol. 17, Issue 3, Jun. 1988 (p. 109-116).
International Search Report and Written Opinion for related PCT Application No. PCT/US2013/073347, dated May 21, 2014 (8 pages).
(Continued)

*Primary Examiner* — Bryce P Bonzo
*Assistant Examiner* — Anthony J Amoroso
(74) *Attorney, Agent, or Firm* — Winthrop & Weinstine, P.A.

(57) ABSTRACT

A method for surveying a data storage subsystem for latent errors before a failing disk drive of the data storage subsystem fails and recovering unreadable data usable to reconstruct data of the failing disk drive. The method includes determining that a disk drive of a plurality of disk drives of the data storage subsystem meets a threshold for being identified as a failing disk drive, and prior to failure of the failing disk drive, surveying at least a portion of the data on the remaining plurality of disk drives to identify data storage areas with latent errors. The identified data storage areas may be reconstructed utilizing, at least in part, data stored on the failing disk drive.

20 Claims, 3 Drawing Sheets

(51) Int. Cl.
*G06F 11/07* (2006.01)
*G06F 11/20* (2006.01)
*G06F 11/14* (2006.01)

(52) U.S. Cl.
CPC ........ *G06F 11/0703* (2013.01); *G06F 11/076* (2013.01); *G06F 11/0727* (2013.01); *G06F 11/0751* (2013.01); *G06F 11/1092* (2013.01); *G06F 11/2069* (2013.01); *G06F 11/1448* (2013.01); *G06F 2211/1088* (2013.01)

(58) Field of Classification Search
CPC ............... G06F 11/0751; G06F 11/076; G06F 11/1092; G06F 11/2069; G06F 11/1448; G06F 2211/1088
See application file for complete search history.

(56) References Cited

U.S. PATENT DOCUMENTS

| | | | |
|---|---|---|---|
| 7,574,623 | B1 | 8/2009 | Goel et al. |
| 7,590,801 | B1 | 9/2009 | Gavarre et al. |
| 7,613,945 | B2 | 11/2009 | Soran et al. |
| 2002/0162075 | A1* | 10/2002 | Talagala .............. G06F 11/1076 714/819 |
| 2003/0167439 | A1 | 9/2003 | Talagala et al. |
| 2005/0283655 | A1* | 12/2005 | Ashmore .............. G06F 11/004 714/6.32 |
| 2008/0115017 | A1 | 5/2008 | Jacobson |
| 2009/0055682 | A1* | 2/2009 | Gibson ............... G06F 11/1076 714/6.12 |
| 2012/0079189 | A1 | 3/2012 | Colgrove et al. |
| 2012/0084600 | A1 | 4/2012 | Kidney et al. |

* cited by examiner

RAID SURVEYOR

CROSS REFERENCE TO RELATED APPLICATIONS

This application is a continuation of U.S. patent application Ser. No. 13/706,553, titled "RAID SURVEYOR," filed Dec. 6, 2012, the disclosure of which is hereby incorporated by reference herein in its entirety.

FIELD OF THE INVENTION

The present disclosure generally relates to systems and methods for surveying a data storage system for latent errors. Particularly, the present disclosure relates to systems and methods for surveying a data storage subsystem or other information handling system for latent errors prior to disk failure, thereby improving fault tolerance.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An ongoing concern in many information handling systems, and particularly data storage systems, is data reliability. Of course, many solutions have been developed to increase data reliability, including for example, the utilization of RAID (redundant array of independent disks) systems, which, in general, combine multiple disk drives into a logical unit with data being distributed across the drives in one of several ways called RAID levels, depending on the level of capacity, redundancy, and performance desired or required. See, David A. Patterson, Garth Gibson, and Randy H. Katz: *A Case for Redundant Arrays of Inexpensive Disks (RAID)*; University of California Berkeley, 1988. RAID techniques have generally increased data reliability.

Nonetheless, there are several scenarios where failing disks can leave user data in an unrecoverable state. For example, in one single-redundant RAID scenario, a particular disk may accumulate too many error recovery attempts and thus trigger a rebuild in order to migrate each RAID extent from the failing disk to a spare disk. In the meantime, while the extent is rebuilding, data of another disk within the rebuilding stripe may become unreadable due to a latent error, i.e., an error that is not readily apparent because the data block is written to, but yet the data is not readable. A read of this data is required, however, in order to reconstruct the data of the disk being rebuilt, and thus the rebuild cannot continue, leaving the user data in an unrecoverable state.

Data scrubbing has been introduced as a means for periodically reading and checking, by the RAID controller, all the blocks in a RAID array to detect bad blocks before they are used. However, conventional RAID scrubbing does not detect latent errors quickly enough for significantly improving data reliability. The conventional RAID scrub operation works on a single RAID device at a time and works on RAID logical block addresses rather than "vertically," so to speak conceptually, on disks or disk extents. As a scrub progresses through the stripes on a RAID device, it sends input/output (I/O) to all of the disks associated with the RAID device. In the case where a particular disk is suspect, it reads all of the other disks of the RAID device, which wastes valuable time when the suspect disk is in immediate jeopardy of failing. Additionally, in a system with multiple disk tiers, the conventional RAID scrub operation is not prioritized to favor disk types, such as those that have a higher tendency for failure. For example, if the disks in a lower, less expensive storage tier are suspect to failing relatively more often than disks in other relatively more expensive storage tiers, time scrubbing disks in the higher, relatively more expensive storage tiers may essentially be wasted.

In view of the foregoing, if it is suspected that a disk is in jeopardy of failing, it can be very useful to know before degrading that disk for replacement that the associated RAID stripes of all extents on that disk can be read in order to reconstruct all the data, or as much data as possible, residing on the failing disk. With the conventional RAID scrub operation, there is generally no way to quickly and efficiently determine this, absent launching scrubs on all RAID devices associated with all disks within a storage tier. Launching scrubs on all RAID devices associated with all disks within a storage tier, however, is simply too slow and consumes too many resources. A specific example of this problem is provided in FIG. 1, which illustrates an example data storage system 100 showing 10 separate disks, with only "Disk X" 102, which is illustrated vertically in the figure for simplicity, being fully shown and labeled for purposes of discussion. As can be seen from FIG. 1, data has been distributed across the 10 shown disks in three RAID configurations: RAID 5 spread across 5 extents; RAID 10 spread across 2 extents; and RAID 6 spread across 6 extents. As will be appreciated by those skilled in the art, the actual physical configuration and layout of the extents and RAID stripe data will typically depend on several factors; accordingly, FIG. 1 serves only as a conceptual example for purposes of discussion. Consider Disk X to be failing or otherwise returning too many significant errors. In order to determine whether all the data on Disk X can be reconstructed utilizing the conventional scrubbing operation, the entirety of the RAID 5, RAID 10, and RAID 6 devices would need to be scrubbed. However, this determination could more efficiently be made if there was a system and method for reading or surveying only the information contained in the horizontal stripes shown in this diagram. Now, consider that the data storage system 100 comprises a significantly larger number of disks than simply the 10 shown, for example, 90 additional disks with data similarly distributed; the efficiencies of such a novel system and method would be increased significantly.

Accordingly, the conventional RAID scrub operation is insufficient to determine the desired information relating to associated RAID stripes of all extents on a failing disk. There is a need in the art for improved methods for determining this information at a disk or disk extent level. More generally, there is a need in the art for systems and methods for surveying a data storage system for latent errors, and particularly, systems and methods for surveying a data storage subsystem or other information handling system for latent errors prior to disk failure, thereby improving fault tolerance.

BRIEF SUMMARY OF THE INVENTION

The present disclosure, in one embodiment, relates to a method for surveying a data storage subsystem for latent errors before a failing disk drive of the data storage subsystem fails and recovering unreadable data usable to reconstruct data of the failing disk drive, wherein the data storage subsystem provides storage abstractions of a plurality of disk drives. The method includes determining that a disk drive of the plurality of disk drives meets a threshold for being identified as a failing disk drive, and prior to failure of the failing disk drive, surveying at least a portion of the data on the remaining plurality of disk drives to identify data storage areas with latent errors. The method further includes reconstructing the identified data storage areas utilizing, at least in part, data stored on the failing disk drive. In some embodiments, surveying may include identifying RAID extents on the failing disk drive, identifying data storage areas on the remaining plurality of disk drives in RAID stripes corresponding to the RAID extents identified on the failing disk drive, and performing read operations to identify the data storage areas with latent errors. Surveying may be initiated automatically upon identification of a failing disk drive or may be initiated at user request. In some embodiments, determining that a disk drive is failing may be done based on information relating to the disk drive and/or usage of the disk drive. Furthermore, determining that a disk drive is failing may be performed automatically. In a more particular embodiment, determining that a disk drive is failing may include tracking errors of the disk drive according to a predetermined standard, and identifying the disk drive as failing when the number of tracked errors meets a threshold number of errors. The failing disk drive may be removed and replaced; data of the failing disk drive may then be rebuilt on the replacement disk utilizing data from the remaining plurality of disk drives. In some embodiments, the reconstructed data storage areas may be resurveyed to confirm successful correction of the latent errors.

The present disclosure, in another embodiment, relates to an information handling system. The information handling system may include a data storage subsystem providing storage abstractions of a plurality of disk drives, and a disk controller. The disk controller may have access to the data storage subsystem and is configured to: determine whether a disk drive of the plurality of disk drives meets a threshold for being identified as a failing disk drive; prior to failure of the failing disk drive, survey at least a portion of the data on the remaining plurality of disk drives to identify data storage areas with latent errors; and reconstructing the identified data storage areas utilizing, at least in part, data stored on the failing disk drive.

The present disclosure, in yet another embodiment, relates to a method for surveying a data storage subsystem for latent errors before a failing disk drive of the data storage subsystem fails and recovering unreadable data usable to reconstruct data of the failing disk drive. The method may include automatically tracking errors of a plurality of disk drives of the data storage subsystem according to a predetermined standard and identifying a disk drive as a failing disk drive when tracked errors for the disk drive satisfy a predetermined threshold. Prior to complete failure of the failing disk drive, data storage areas on the remaining plurality of disk drives in stripes corresponding to extents on the failing disk drive may be identified and surveyed for latent errors. The data storage areas with latent errors may be reconstructed utilizing, at least in part, data stored on the failing disk drive.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous systems and methods for surveying a data storage system for latent errors. Particularly, the present disclosure relates to novel and advantageous systems and methods for surveying a data storage subsystem or other information handling system for latent errors prior to disk failure, thereby improving fault tolerance.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the various embodiments are not limited to any particular type of information handling system, the systems and methods of the present disclosure may be particularly useful in the context of a disk drive system, or virtual disk drive system, such as that described in U.S. Pat. No. 7,613,945, titled "Virtual Disk Drive System and Method," issued Nov. 3, 2009, the entirety of which is hereby incorporated herein by reference. Such disk drive systems allow the efficient storage of data by dynamically allocating user data across a page pool of storage, or a matrix of disk storage blocks, and a plurality of disk drives based on, for example, RAID-to-disk mapping. In general, dynamic allocation presents a virtual disk device or volume to user servers. To the server, the volume acts the same as conventional storage, such as a disk drive, yet provides a storage abstraction of multiple storage devices, such as RAID devices, to create a dynamically sizeable storage device. Data progression may be utilized in such disk drive systems to move data gradually to storage space of appropriate overall cost for the data, depending on, for example but not limited to, the data type or access patterns for the data. In general, data progression may determine the cost of storage in the disk drive system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such disk drive systems may protect data from, for example, system failures or virus attacks by automatically generating and storing snapshots or point-in-time copies of the system or matrix of disk storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

Figure 2:
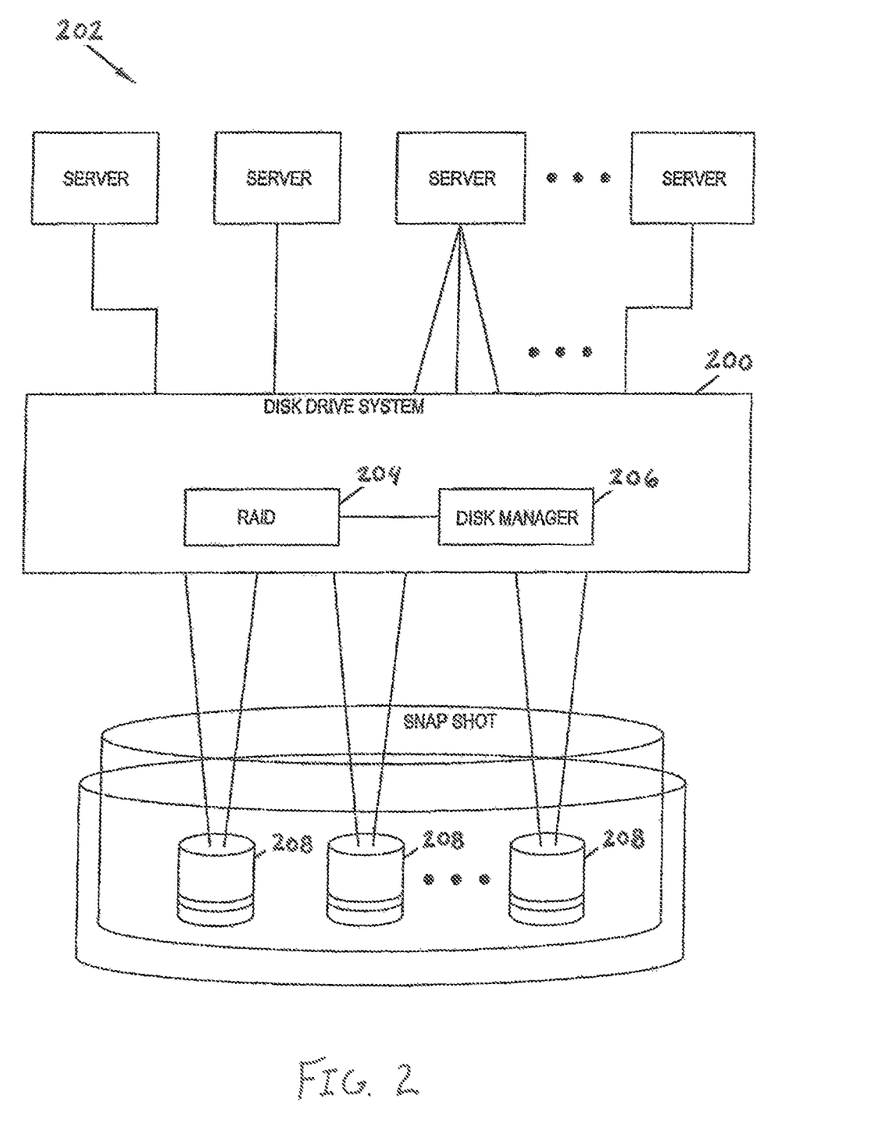
FIG. 2 is a schematic of a disk drive system suitable with the various embodiments of the present disclosure.

FIG. 2 illustrates one embodiment of a disk drive or data storage system 200 in an information handling system environment 202, such as that disclosed in U.S. Pat. No. 7,613,945, and suitable with the various embodiments of the present disclosure. As shown in FIG. 2, the disk drive system 200 may include a data storage subsystem 204, which may include a RAID subsystem, as will be appreciated by those skilled in the art, and a disk manager 206 having at least one disk storage system controller. The data storage subsystem 204 and disk manager 206 can dynamically allocate data across disk space of a plurality of disk drives 208 based on, for example, RAID-to-disk mapping or other storage mapping technique.

As discussed above, data scrubbing has been introduced as a means for periodically reading and checking all the blocks in a RAID system to detect bad blocks before they are used. However, the conventional RAID scrub operation works on a single RAID device at a time and works on RAID logical block addresses rather than "vertically," so to speak conceptually, on disks or disk extents. Additionally, in a system with multiple disk tiers, the conventional RAID scrub operation is not prioritized to favor disk types, such as those that have a higher tendency for failure. Accordingly, with the conventional RAID scrub operation, there is generally no way to quickly and efficiently determine whether if a disk is suspected of failing, that the associated RAID stripes of all extents on that disk can be read in order to reconstruct all the data, or as much data as possible, residing on the failing disk. Launching scrubs on all RAID devices associated with all disks within a storage tier is simply too slow and consumes too many resources.

The present disclosure improves on conventional data scrubbing and fault tolerance in a data storage system or other information handling system, such as but not limited to the type of data storage system described in U.S. Pat. No. 7,613,945. Particularly, the present disclosure relates to, what is referred to herein but should not be limited by name as, a data surveyor or RAID surveyor (or simply "surveyor") for a data storage subsystem or information handling system. The disclosed embodiments can provide improved fault tolerance to excessive errors and improved back-end resiliency.

In general, a function of the various embodiments of a surveyor described herein is to survey a data storage system for latent errors before a disk fails and recovering any unreadable data that is needed to reconstruct the failed disk. That is, in general, a surveyor may read disk or RAID extents and write-correct any latent errors or unreadable data areas prior to a rebuild operation. The surveyor may target operations at the RAID extent level rather than at the conventional data scrubbing RAID device level, as discussed above. That is, given a target failing disk, the surveyor may determine all the extents residing on that disk. For each of the identified extents, surveyor may read all of the associated stripe data, optionally excluding the stripe data on the target disk, as that data is not required to reconstruct the data of the target disk, and since presumably the target disk is failing or otherwise having trouble, sending unnecessary I/O to the target disk may be particularly undesirable. The surveyor may then write-correct any latent errors or unreadable data areas prior to a rebuild operation for the target disk. Indeed, once all surrounding latent errors are corrected, the failing disk can be replaced and rebuilt with relative ease.

At a more specific level, an embodiment of the present disclosure is described with reference to the relatively simple data storage system example 302 shown in FIG. 3, which illustrates data distributed in blocks across four disks or disk extents 304, 306, 308, 310, labeled "Disk 0," "Disk 1," "Disk 2," and "Disk 3," respectively, in three stripes 312, 314, and 316. There is no data currently written to stripe 318. Although any RAID configuration and level could be employed and used with the various embodiments of the present disclosure, in FIG. 3, a configuration of RAID 5 across four disks or disk extents has been selected for ease of illustration. Under the RAID 5 paradigm, parity information is distributed along with data across the disks or disk extents. All but one of the drives must be present to operate correctly, and as such, operation of the RAID array will not destroyed by a single disk failure. More specifically, upon a single drive failure, any reads to the failed disk can be calculated from the remaining distributed data and parity information on the operating disks in the RAID array. Nonetheless, a single drive failure typically results in reduced performance of the entire RAID array until the failed drive is replaced and the data rebuilt.

Figure 3:
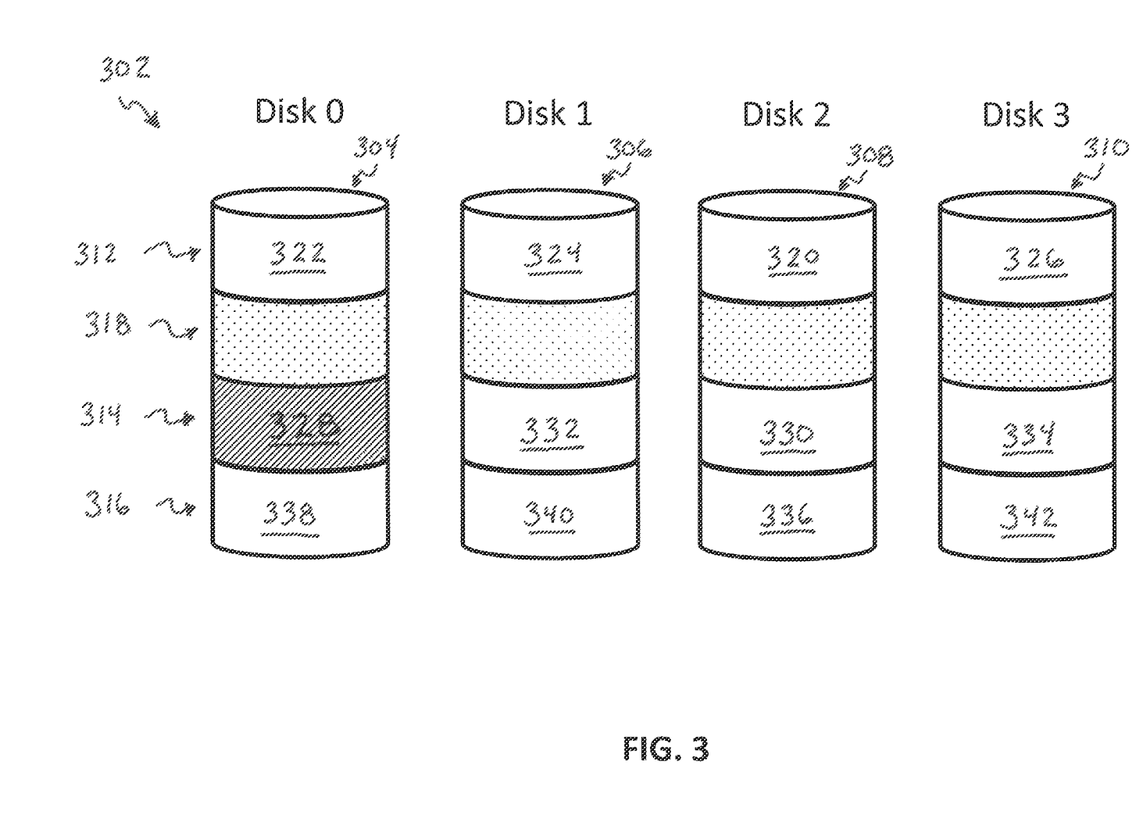
FIG. 3 is a schematic of a relatively simple data storage system illustrating a method for surveying a data storage system for latent errors according to one embodiment of the present disclosure.

Consider a failure of Disk 2 in FIG. 3. Disk 2 needs to be replaced and the data stored in the data blocks of Disk 2 need to be rebuilt on the replacement disk. Although Disks 0-3 are labeled as "disks" in FIG. 3, it is recognized that any suitable storage extent, storage device, or combination of storage device types, including but not limited to tape drives and/or solid state drives, may be utilized. In many cases, rebuilding the data can be rather uneventful. For example, the data of data block 320, may be efficiently calculated from the remaining data and parity distributed across Disks 0, 1, and 3 in data blocks 322, 324, and 326.

However, consider a latent error on one of the operational disks or disk extents, such as illustrated at data block 328 on Disk 0, rendering the data of data block 328 unreadable. Upon the same failure and replacement of Disk 2, in order to rebuild data block 330 of Disk 2 on the replacement disk, the data from data blocks 328, 332, and 334 of Disks 0, 1, and 3, respectively, would be required. However, because both Disk 2 has failed and data block 328 is unreadable, there is a double failure, and the data of data block 330 is rendered unrecoverable. Thus, it is desirable that such latent errors be corrected prior to disk failures.

Accordingly, in one embodiment, prior to failure of a disk, it may first be determined whether any given disk is suspected of failing or is otherwise having increased difficulties returning accurate data. Any suitable method of determining when a disk is failing or about to fail may be used in accordance with the present disclosure. In one embodiment, this may be determined based, at least in part, on information about the disk or common usage information for the disk, such as but not limited to, how long the drive has been in service, the type and quality of the drive, the size of the drive, the number of I/O operations performed on the drive, the storage tier in which the drive is located, or any other suitable information. Such determination may be manually performed or may be automatic. In additional or alternative embodiments, a disk failure may be sensed by automatically tracking the number of significant errors returned when performing I/O to a disk. When a certain threshold number of errors has been reached, the disk may be flagged or otherwise identified as suspected of imminent failure. "Imminent failure," as used herein, is not meant to be limited to only disks in actual danger of imminent failure, but also to disks suspected of failure or otherwise flagged as failing, without regard to whether they are actually failing or in real danger of imminent failure. Indeed, even a perfectly operable disk may be identified as suspected of imminent failure, depending on the factors and method of determining such status. Also, what is determined to be a "significant" error may vary from system to system, but may generally be a predetermined standard for any given system. In one embodiment, a significant error may include any result of a read operation to the disk that is determined to be inaccurate and/or that is unreadable. Of course, that is just one example of what may be determined as "significant" and is not the only manner of determining significant errors. Additionally, the threshold number of errors that is used to determine that a disk is nearing imminent failure may vary from system to system, from storage tier to storage tier, from disk type to disk type, etc., and may be any suitable threshold as determined by the system, administrator, or other user, as desired or required. Furthermore, in other embodiments, the threshold need not be a specific number of errors, but may be a percentage of errors as compared to some reference number, may be a specific number of error occurrences within a specified time period or other rate at which errors are received, or may be a threshold determined by any other suitable method of identifying a limit or range.

In one embodiment, when a disk failure is expected or is otherwise sensed, the surveyor may be run to generally determine whether any latent errors exist in the data storage areas required to rebuild the data stored on the failing disk. The surveyor may be run automatically upon detection of a failing disk, as described above, or it may be run at user or administrator request. In other embodiments, the time at which the surveyor is run need not be based on a determination of whether a disk failure is imminent, but rather could be based on any other factor and may be run manually or automatically at any suitable timing interval, including but not limited to periodically, randomly, at user request, continuously, etc.

In general, as described above, the surveyor may determine all the extents residing on that disk, and for each of the identified extents it may read all of the associated stripe data, optionally excluding the stripe data on the target disk, as that data is not required to reconstruct the data of the target disk. If any of the read operations reveals a latent error, the surveyor may then write-correct the unreadable data areas. Thus, the latent errors may be corrected prior to a complete failure and rebuild operation for the target disk.

With specific reference to the data storage system of FIG. 3, for example only, it may be determined that Disk 2 has returned, or is returning, too many significant errors so as to reach or pass the predetermined threshold for identifying that a disk is suspected of imminent failure. Upon such detection, the surveyor may determine all the extents residing on that disk, and for each of the identified extents it may read all of the associated stripe data, excluding the stripe data on Disk 2, as that data is not required to reconstruct the data of Disk 2. In the simplified example of FIG. 3, accordingly, the surveyor may identify data blocks 320, 330, and 336 as residing on the failing Disk 2. For each of the identified data blocks 320, 330, 336, the surveyor may identify the data blocks in the associated stripes 312, 314, 316 which need to be surveyed for latent errors prior to complete failure of Disk 2. In this example, the surveyor would identify and thus survey, or attempt reads of, data blocks 322, 324, and 326 of stripe 312, data blocks 328, 332, and 334 of stripe 314, and data blocks 338, 340, and 342 of stripe 316. The surveyor would not need to survey any data blocks in stripe 318, as Disk 2 has no data written to that stripe. Upon surveying the data blocks of stripe 314, the surveyor would identify a latent error associated with data block 328. To correct the latent error, the surveyor may reconstruct the data of block 328 utilizing data blocks 332, 330, and 334 of Disks 1, 2, and 3, respectively. It is possible for the surveyor to correct the latent error in data block 328 because the suspected failure of Disk 2 has been identified prior to actual failure of the disk, and thus the data in data block 330 remains available to reconstruct data block 328. The surveyor would perform the same action for each latent error identified. As no other latent errors would be found in the example of FIG. 3, however, Disk 2 could then be removed and replaced with a new disk, and the data of Disk 2 could be accurately reconstructed from the data of Disks 0, 1, and 3 with relative ease.

In further embodiments, the surveyor may re-survey the sections previously identified as having latent errors to make a determination as to whether the read of the stripe data has improved, and thus the latent error indeed removed. However, in other cases, the latent errors may be presumed fixed upon write-correcting them.

Figure 1:
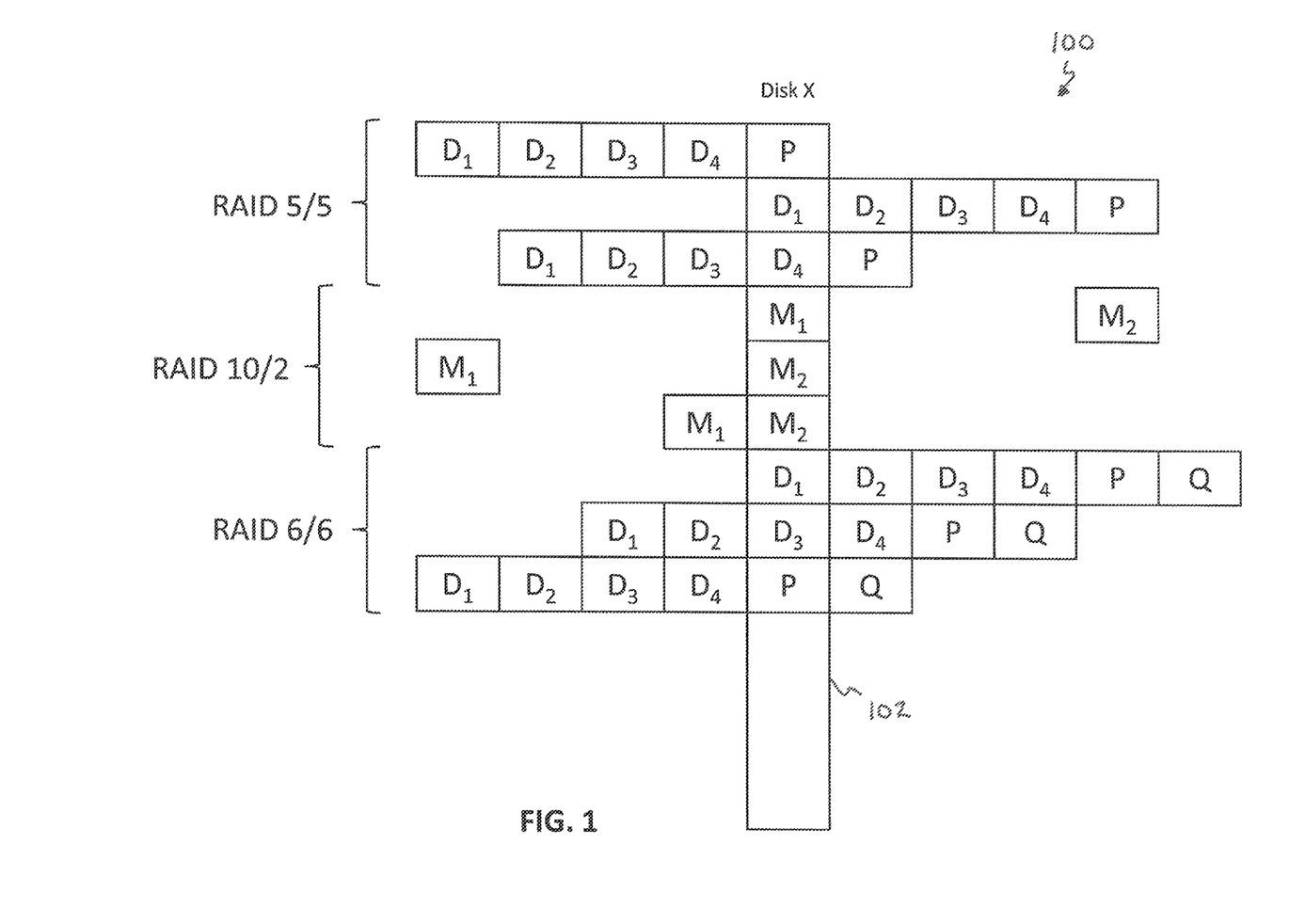
FIG. 1 is a diagrammatic and conceptual example data storage system having data distributed across 10 disks in three RAID configurations illustrating a common problem with utilizing conventional data scrubbing to increase fault tolerance.

Although discussed above with respect to the relatively simple data storage system of FIG. 2 employing RAID 5, much more complex data storage systems are contemplated as within the spirit and scope of the present disclosure, including data storage systems of fewer or greater disks or disk extents, and with the storage space being divided into logical blocks in any organized or unorganized manner. Similarly, RAID need not be employed, but if employed, any RAID level or combination of RAID levels may be used throughout the data storage system. The example of FIG. 2 is provided for ease of illustration only, and is not intended to be limiting to such a simple data storage system. For example, FIG. 1 provides an example data storage system with more complex RAID configurations, which as noted above, would benefit from the various embodiments of the present disclosure. In general, the systems and methods for a data surveyor or RAID surveyor described herein may be employed on any data storage system or other information handling system employing some sort of redundancy scheme where data of a failing storage section may be rebuilt from data stored at one or more other operational storage sections, whether the redundancy involves mirroring, RAID, or other storage technique now existing or later developed. The various embodiments for systems and methods for a data surveyor or RAID surveyor described herein help maintain the accuracy of the redundant data and thus increase fault tolerance.

Additionally, in embodiments with additional redundancy, such as dual redundant RAID devices, e.g., RAID 6 and RAID 10, the constraints of the surveyor may be loosened because of the heightened redundancy and built-in increased fault tolerance of such systems. For example, the surveyor may tolerate or ignore a single read failure or latent error per data stripe since even with one read failure, there remains enough built-in redundancy on these systems to reconstruct the data without the failing disk. However, a surveyor as described herein can nonetheless further improve the efficiency and fault tolerance of such systems, particularly where more than a single latent error exists on a data stripe.

Further yet, while disclosed with respect to a surveyor, it is recognized that the surveyor could comprise one or more of such surveyors and that a surveyor may be comprised of any combination of separate software and hardware components and/or may be operated on one or more disk controllers of a data storage subsystem. Indeed, a surveyor may comprise multiple software components, each performing a particular function, with any of the software components operating one or more interconnected or disjointed hardware components.

The various embodiments of the present disclosure relating to systems and methods for surveying a data storage subsystem or other information handling system for latent errors prior to disk failure provide significant advantages over conventional data scrubbing methods, discussed above. For example, the various embodiments of the present disclosure may increase fault tolerance by helping avoid multiple read failures (whether from disk failure or latent errors), resulting in unrecoverable data, and in quickly and efficiently detecting latent errors before complete disk failure. Thus the systems and methods of the present disclosure can serve to avoid unrecoverable scenarios and to improve rebuild times by eliminating non-productive work during rebuilds as would be required utilizing conventional RAID scrub operations.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method for surveying a data storage subsystem for latent errors before a failing storage device drive of the data storage subsystem fails and recovering unreadable data usable to reconstruct data of the failing storage device drive, the method comprising:
   determining a storage device drive of the plurality of storage device drives meets a threshold for being identified as a failing drive; and
   upon identifying the storage device drive as a failing drive and prior to failure of the failing drive:
      identifying at least a portion of data storage areas of the remaining plurality of storage device drives having a redundant relationship to one or more data storage areas of the failing drive;
      reading the identified data storage areas having a redundant relationship to one or more storage areas of the failing drive to identify a data storage area thereof with a latent error; and
      write-correcting the data storage area identified as having a latent error utilizing, at least in part, data stored on the failing drive.

2. The method of claim 1, wherein identifying at least a portion of data storage areas of the remaining plurality of storage device drives comprises identifying RAID extents on the failing drive.

3. The method of claim 2, wherein identifying at least a portion of data storage areas of the remaining plurality of storage device having a redundant relationship to one or more data storage areas of the failing drive further comprises identifying data storage areas of the remaining plurality of storage device drives in RAID stripes corresponding to RAID extents identified on the failing drive.

4. The method of claim 3, wherein identifying at least a portion of data storage areas of the remaining plurality of storage device drives having a redundant relationship to one or more data storage areas of the failing drive is initiated automatically upon identification of a failing drive.

5. The method of claim 4, wherein determining a storage device drive of the plurality of storage device drives meets a threshold for being identified as a failing drive is performed automatically.

6. The method of claim 3, wherein identifying at least a portion of data storage areas of the remaining plurality of storage device drives having a redundant relationship to one or more data storage areas of the failing drive is initiated at user request.

7. The method of claim 3, wherein determining a storage device drive of the plurality of storage device drives meets a threshold for being identified as a failing drive is based on information relating to at least one of the storage device drive and usage of the storage device drive.

8. The method of claim 3, wherein determining a storage device drive of the plurality of storage device drives meets a threshold for being identified as a failing drive comprises:
   tracking errors of the storage device drive according to a predetermined standard; and
   identifying the storage device drive as failing when the number of tracked errors meets a threshold number of errors.

9. The method of claim 3, further comprising rereading the write-corrected data storage area to confirm successful correction of the latent error.

10. The method of claim 1, wherein determining a storage device drive of the plurality of storage device drives meets a threshold for being identified as a failing drive comprises:
   tracking errors of the storage device drive according to a predetermined standard; and
   identifying the storage device drive as failing when the number of tracked errors meets a threshold number of errors.

11. The method of claim 1, further comprising removing the failing drive and replacing it with a replacement storage device drive.

12. The method of claim 11, further comprising rebuilding the data of the failing drive on the replacement storage device drive utilizing data from the remaining plurality of storage device drives.

13. An information handling system comprising:
   a data storage subsystem providing storage abstractions of a plurality of storage device drives; and
   a device controller with access to the data storage subsystem that:
      determines a storage device drive of the plurality of storage device drives meets a threshold for being identified as a failing drive; and
      upon identifying the storage device drive as a failing drive and prior to failure of the failing drive:
         identifies at least a portion of data storage areas of the remaining plurality of storage device drives having a redundant relationship to one or more data storage areas on the failing drive;
         reads the identified data storage areas having a redundant relationship to one or more storage areas of the failing drive to identify a data storage area thereof with a latent error; and
         write-corrects the data storage area identified as having a latent error utilizing, at least in part, data stored on the failing drive.

14. The system of claim 13, wherein the device controller identifies at least a portion of data storage areas of the remaining plurality of storage device drives having a redundant relationship to one or more data storage areas on the failing drive by:
   identifying RAID extents on the failing drive;
   identifying data storage areas on the remaining plurality of storage device drives in RAID stripes corresponding to RAID extents identified on the failing drive.

15. The system of claim 13, wherein the device controller determines a storage device drive of the plurality of storage device drives meets a threshold for being identified as a failing drive based on information relating to at least one of the storage device drive and usage of the storage device drive.

16. The system of claim 15, wherein information relating to usage of the storage device drive comprises errors of the storage device drive tracked according to a predetermined standard.

17. A method for surveying a data storage subsystem for latent errors before a failing storage device drive of the data storage subsystem fails and recovering unreadable data usable to reconstruct data of the failing storage device drive, the method comprising:
   automatically tracking errors of a plurality of storage device drives of the data storage subsystem according to a predetermined standard and identifying a storage device drive as a failing drive when tracked errors for the storage device drive satisfy a predetermined threshold; and
   upon identifying the storage device drive as a failing drive and prior to complete failure of the failing drive:
      identifying data storage areas on the remaining plurality of storage device drives in at least a portion of RAID stripes corresponding to RAID extents on the failing drive;
      reading the identified data storage areas for latent errors; and
      write-correcting the data storage area identified as having a latent error utilizing, at least in part, data stored on the failing drive.

18. The method of claim 17, further comprising removing the failing drive and replacing it with a replacement storage device drive.

19. The method of claim 17, further comprising rereading the write-corrected data storage area to confirm successful correction of the latent error.

20. The method of claim 17, further comprising:
   removing the failing drive and replacing it with a replacement storage device drive; and
   rebuilding the data of the failing drive on the replacement storage device drive utilizing data from the remaining plurality of storage device drives.

* * * * *